(12) United States Patent
McKendry

(10) Patent No.: US 7,726,681 B2
(45) Date of Patent: Jun. 1, 2010

(54) SYSTEM AND METHOD FOR PREVENTING RATTLING IN RECEIVER HITCH ARRANGEMENT

(76) Inventor: Douglas J. McKendry, 488551 Shady View Dr., Palm Desert, CA (US) 92260

( * ) Notice: Subject to any disclaimer, the term of this patent is extended or adjusted under 35 U.S.C. 154(b) by 240 days.

(21) Appl. No.: 11/825,814

(22) Filed: Jul. 9, 2007

(65) Prior Publication Data

US 2009/0014983 A1 Jan. 15, 2009

(51) Int. Cl.
*B60D 1/24* (2006.01)
(52) U.S. Cl. ....................... 280/506; 292/143
(58) Field of Classification Search ............... 280/506; 292/170, 165, 166, 168
See application file for complete search history.

(56) References Cited

U.S. PATENT DOCUMENTS

| | | | |
|---|---|---|---|
| 4,576,501 A * | 3/1986 | McConnell | 403/59 |
| 4,818,135 A * | 4/1989 | Desjardins | 403/104 |
| 5,344,175 A | 9/1994 | Speer | |
| 5,735,539 A | 4/1998 | Kravitz | |
| 5,879,102 A | 3/1999 | Koliopoulos | |
| 6,105,989 A * | 8/2000 | Linger | 280/506 |
| 6,142,502 A * | 11/2000 | Breslin | 280/506 |
| 6,820,890 B2 * | 11/2004 | Westerdale | 280/507 |
| 6,974,146 B2 | 12/2005 | Kolda | |
| 7,004,491 B1 * | 2/2006 | Allsop et al. | 280/506 |

* cited by examiner

*Primary Examiner*—Tony H. Winner
(74) *Attorney, Agent, or Firm*—James Ray & Assoc

(57) ABSTRACT

A receiver hitch arrangement includes a receiver tube, a mount having a shank portion received within the receiver tube and a hitch pin inserted through hitch pin apertures which are formed in both the receiver tube and the shank portion and which are aligned at assembly to maintain the mount in a position for towing. A rattling that is usually caused due to movement between hitch components. is prevented by forming a pair of through and threaded apertures in each vertical wall of the receiver tube and in close proximity to a free end thereof, threadeably engaging a threaded shank of a fastener with each of the pair of apertures and then operably advancing each fastener for direct contact with the shank portion of the mount inserted into the receiver tube until the shank portion is frictionally caged and immobilized.

5 Claims, 1 Drawing Sheet

SYSTEM AND METHOD FOR PREVENTING RATTLING IN RECEIVER HITCH ARRANGEMENT

FIELD OF THE INVENTION

The present invention relates, in general, to trailer hitch receivers and, more particularly, this invention relates to a system and method for preventing rattling in a receiver hitch arrangement due to movement of the interconnected members and method for using aforementioned system.

BACKGROUND OF THE INVENTION

One problem that is continuously experienced in use of the receiver type hitches is that since the receiver tube is slightly larger than the mount's shank, the hitch arrangement is characterized by a rattle effect due to the space formed between the outer peripheral surface of the shank and the inner peripheral surface of the receiver tube and, consequently, due to the shank selectively engaging side walls of the receiver tube during motion.

Prior to the present invention, efforts have been made to eliminate the rattling.

U.S. Pat. No. 6,105,989 issued to Linger discloses one type of a rattle eliminating device which includes a collar, an adjustment bolt, a lock nut and a second nut. The collar has a center wall and two side walls forming a U-shaped bracket that can fit over a reinforcing lip of the hitch receiver tube. A front wall on the collar has an opening for receiving a mount shank as it enters the receiver tube. An adjustment bolt extends through the center wall to tighten the collar onto the hitch receiver tube. When the adjustment bolt is tightened, the center wall of the collar moves upward and away from the receiver tube, causing the opening in the front wall to lift the shank against the inner wall of the tube and prevent it from moving within the tube. The lock nut then holds the entire anti-rattle assembly into position.

U.S. Pat. No. 5,735,539 issued to Kravitz discloses another type of the rattle eliminating device which includes a bridge element, a spaced pair of flanges secured to and projecting from the bridge element so that the bridge element and the flanges together straddle at least one of the receiver and shank, the flanges being connected to at least one of the receiver and shank, and the mechanism includes a spaced pair of projections each engaging a different one of the receiver and shank whereby to tighten the telescopic connection therebetween.

U.S. Pat. No. 6,974,147 issued to Kolda teaches a system which includes an engagement or locking member, which may be in the form of a cam, that is movably mounted within an interior defined by the shank. An actuator arrangement is carried by the shank and is interconnected with the cam, for moving the cam between an operative position and a release position. The cam bears against the receiver tube, and is configured such that movement of the cam from the release position to the operative position, in response to operation of the actuator arrangement, causes the cam to move laterally through an opening in the shank into engagement with an internal surface defined by the receiver tube. In this manner, the cam applies a lateral force that urges the shank laterally into engagement with an internal surface defined by the receiver tube. The actuator arrangement may be in the form of a rotatable knob secured to the shank, which is interconnected with an actuator rod that moves axially in response to rotation of the rotatable knob so as to cause pivoting movement of the cam between the operative position and the release position.

In U.S. Pat. No. 5,879,102 issued to Koliopoulos it is attempted to provide a clamp that locks two telescoping components such as a vehicle receiver hitch and a draw bar, for substantially reducing if not eliminating the "banging" or "rattling" between the two components. The clamp includes a standard sized U-bolt, whose throat rests in a seat formed by a receiver hitch collar and a receiver hitch tube. A bar has an arc-shaped cross-section and includes two holes adapted for receiving the threaded ends of the U-bolt. When the draw bar is inserted into the receiver hitch, the arc-shaped side of the bar is positioned within a seat formed by the receiver hitch collar and the draw bar. Standard locking style nuts are threaded onto the legs of the U-bolt and tightened, causing the arc-shaped side of the bar to be wedged against the receiver hitch collar and the draw bar, while wedging the U-bolt throat against the opposite side of the receiver hitch collar and the receiver hitch. This effectively "clamps" or locks the draw bar and the receiver hitch together, eliminating any movement of the two pieces.

U.S. Pat. No. 5,344,175 issued to Speer teaches a hitch shank that includes two apertures which a securing pin is indexed through. The first aperture is not within the receiver hitch and contains a threaded interior which coincides with a threaded exterior of a securing pin. The second aperture is located inside the receiver tube and includes an interior wedge member which extends towards the interior of the hitch shank and is parallel with the securing pin. The securing pin includes one tapered end for frictional engagement with both the wedge member and the interior wall of the receiver tube, and a second end for grasping, then rotating the securing pin. As the securing pin is rotated and tightened against the wedge member and the interior wall of the receiver tube, the hitch shank is pressed firmly against the receiver tube towards the side opposing the tapered securing pin end, thereby eliminating all undesired movement between the receiver tube and the hitch shank.

However, the prior art devices and systems are disadvantaged by higher than desirable complexity of installation and quantity of the required components and therefore are characterized by higher than desirable manufacturing and maintenance costs.

Therefore, there is a continuing need for an improved system for preventing rattling in a receiver hitch arrangement.

SUMMARY OF THE INVENTION

According to one aspect, the invention provides a method of preventing rattling in a receiver hitch arrangement. The receiver hitch arrangement includes a receiver tube and a mount having a shank portion which is received within the receiver tube. A hitch pin is inserted through hitch pin apertures which are formed in both the receiver tube and the shank portion and which are aligned therebetween at assembly to maintain the mount in a position for towing. The rattling is due to movement between the receiver tube and the shank portion. The method includes the step of forming at least one through aperture in a predetermined wall of the receiver tube and in close proximity to a free end thereof. Then, threading such at least one through aperture. Next, threadeably engaging a threaded shank of a fastener with the at least one threaded aperture. Operably advancing each fastener for direct contact with an exterior surface portion of the shank portion of the mount inserted into the receiver tube. And finally, frictionally caging the shank portion relative to the receiver tube. The method further includes the step of forming a pair of apertures which are spaced in a vertical direction.

According to another aspect, the invention provides a system for preventing rattling in a receiver hitch arrangement. The system includes a receiver tube which has a first pair of hitch pin apertures formed therein. A mount has a shank portion shaped to be received within the receiver tube. The shank portion has a second pair of hitch pin apertures formed therein. A hitch pin is inserted through the first and second hitch pin apertures which are aligned at assembly to maintain the mount in a position for towing. At least one through aperture is formed in a predetermined wall of the receiver tube and in close proximity to a free end thereof. There is means which is engageable with the receiver tube for preventing rattling of the shank portion received within the receiver tube. The rattle preventing means has a portion thereof being movably received within the through aperture for movement between a first position for directly abutting and immobilizing the shank portion and a second position for releasing the shank portion.

OBJECTS OF THE INVENTION

It is, therefore, one of the primary objects of the present invention to provide a system for preventing rattling in a receiver hitch arrangement.

Another object of the present invention is to provide a system for preventing rattling in a receiver hitch arrangement that eliminates relative movement of the interconnected members.

Yet another object of the present invention is to provide a system for preventing rattling in a receiver hitch arrangement which is economical to manufacture and install.

A further object of the present invention is to provide a a system for preventing rattling in a receiver hitch arrangement which is simple to use.

Yet a further object of the present invention is to provide a system for preventing rattling in a receiver hitch arrangement which does not require use of special tools.

An additional object of the present invention is to provide a method for using the aforementioned system for preventing rattling in a receiver hitch arrangement.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
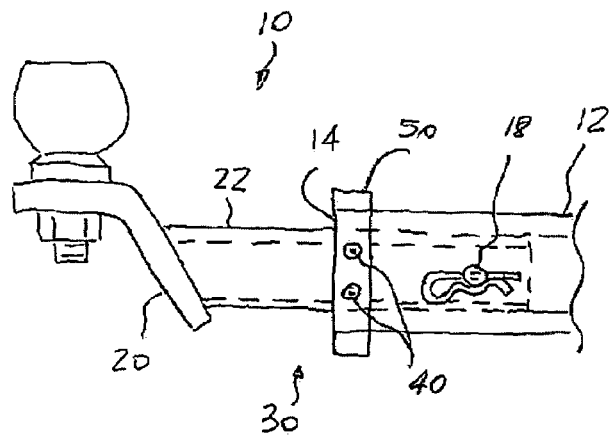
FIG. 1 is a side view of the receiver hitch arrangement and anti-rattle system of the present invention.

Prior to proceeding to the more detailed description of the present invention, it should be noted that, for the sake of clarity and understanding, identical components which have identical functions have been identified with identical reference numerals throughout the several views illustrated in the drawing figures.

Figure 2B:
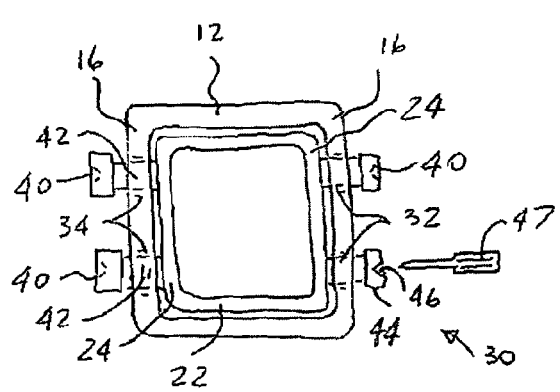
FIGS. 2a and 2b show various embodiments of the anti-rattle system of the present invention.
Figure 2A:
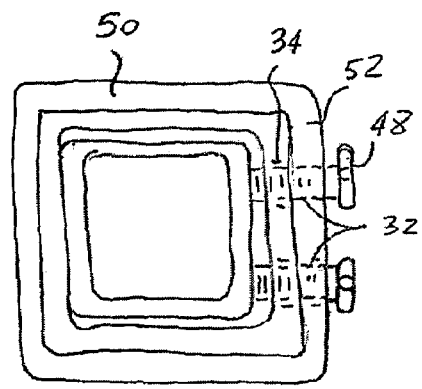
Figure 3:
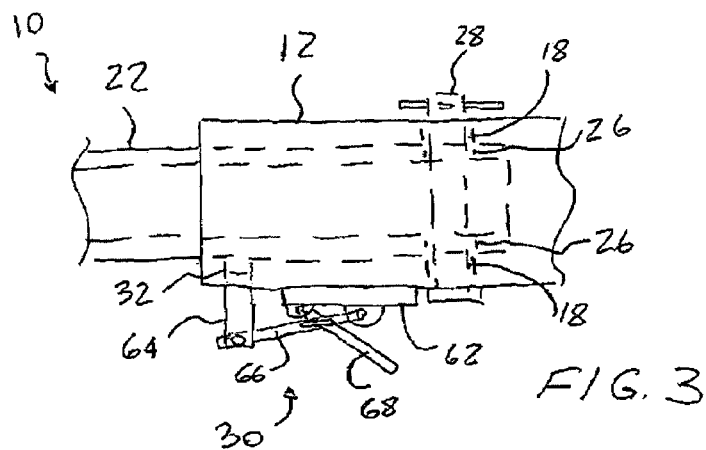
FIG. 3 is a planar view of the anti-rattle system constructed according to yet another embodiment of the present invention.

Reference is now made, to FIGS. 1-3, wherein there is shown a receiver hitch arrangement, generally designated as 10. In a conventional manner, the receiver hitch arrangement 10 includes a receiver tube 12 which has a first pair of hitch pin apertures 18 which are formed in the vertical walls 16 and which are aligned in a horizontal plane. There is also a mount 20 which has a shank portion 22 thereof shaped to be received within the receiver tube 12. The shank portion 22 has a second pair of hitch pin apertures 26 formed in the vertical walls 24 of the shank portion 22. These hitch pin apertures 26 are aligned at assembly with the hitch pin apertures 18 so that a hitch pin 28 can be inserted through all hitch pin apertures 18, 26 in order to maintain the mount 20 in a position for towing.

A system, generally designated as 30, for preventing rattling in the receiver hitch arrangement 10 includes at least one through aperture 32 which is formed in a predetermined wall of the receiver tube 12 and which is further formed in close proximity to a free end 14 thereof. There is also means which is engageable with the receiver tube 12 for preventing rattling of the shank portion 22 received within the receiver tube 12. The rattle preventing means has a portion thereof being movably received within the at least one through aperture 32 for movement between a first position for directly abutting and immobilizing the shank portion 22 and a second portion for releasing the shank portion 22.

According to one embodiment of the invention, the rattle preventing means includes a thread 34 formed in the at least one through aperture 32 and wherein the portion movably received within the through aperture includes a threaded shank 42 of a fastener 40. The fastener 40 may be terminated with a head portion 44 which is adapted for engagement with a predetermined hand tool 47. By way of example only, the head portion 44 may include a cross-shaped cavity 46 for use with a conventional Phillips-type screwdriver 47. Alternatively, the fastener 40 may be terminated with a knob means 48 enabling a tool-free operation of the system 30.

The method of using the system 30 includes the step of forming at least one through aperture 32 in a predetermined wall of the receiver tube 12 in close proximity to a free 14 end thereof. Preferably, such at least one through aperture 32 is formed in one of the vertical walls 16, as such vertical wall 16 is most simply accessed during use. However, it is within the scope of the present invention to form the at least one through aperture 32 in the bottom or top wall of the receiver tube 12. Then, such at least one through aperture 32 is adapted with a thread 34 in a conventional manner. Next, the threaded shank 42 of the fastener 40 is threadeably engaged with the at least one aperture 32 and the fastener 40 is operably advanced for direct contact with the shank portion 22 of the mount 20 inserted into the receiver tube 12. The advancement continues until the shank portion 22 is frictionally caged relative to the receiver tube 12 and, more particularly frictionally caged against the vertical wall 16 which is opposing the vertical wall 16 having the at least one through aperture 32 formed therethrough.

When the receiver hitch arrangement 10 is adapted with the reinforcing lip 50 which is secured onto the free end 14 of the receiver tube 12, as best shown in FIG. 2a, then the through aperture 32 extends though a wall 52 of the reinforcing lip 50 and through the wall 16 of the receiver tube 12.

While a combination of a single aperture 32 and single fastener 40 has been found adequate to prevent rattling of the receiver hitch arrangement 10, wherein the receiver tube has a nominal size of about 1.0 inch, it has been found advantageous to provide a pair of such apertures 32 formed in the wall 16 and spaced in spaced in a vertical direction and a pair of fasteners 40, each received within a respective aperture 32, to improve reliability of the system 30 during use with a larger receiver tube 12 having a nominal size of about 2.0 inches. It will be understood that the use of the system 30 employing such pair of apertures 32 and pair of fasteners 40 will follow the aforedescribed method.

When it is desired to align longitudinal axis of the shank portion 22 with a longitudinal axis of the receiver tube 12, a pair of apertures 32 is formed in each of a pair of vertically disposed walls 16 of the receiver tube 12. Accordingly, the shank portion 22 of the mount 20 will be caged between free ends of the threaded shanks 42 as best shown in FIG. 2b. To align the longitudinal axis, the user equally advances the threaded shanks 42 on each side of the receiver tube 12 thus centering the shank portion 22 within the receiver tube 12.

It will be appreciated that the system 30 provides for economical and simple means for preventing rattling of the receiver hitch arrangement 10 during motion. Aperture or a plurality of apertures 32 can be simply and economically formed within the receiver tube 12 by any user capable of using electric drill (not shown). Furthermore, use of the fastener 40 adapted with the knob means 48 enables the user to selectively mobilize and release the hitch 20 without the use of hand tools. Yet another advantage of the system 30 is that in the event when the fastener 40 is lost or misplaced it can be simply and economically replaced with the like fastener or with any other fastener having identical thread shank 42.

It will be apparent to those skilled in the art that employment of at least a pair of fasteners 40 improves the reliability of the system 30 by allowing partial loosening of one fastener 40 during use.

The present invention enables the user to simply and conveniently remove the shank portion 22 from the receiver tube 12 by simply loosening fasteners 40. Previous efforts of welding a collar onto the shank portion 22 and then removing material from such collar by grinding to improve the fit of the shank portion within the receiver tube 12 eliminated the rattling but resulted in greater than desirable removal effort.

It has been also found that employment of at least a pair of fasteners 40 prevents the vertical movement of the shank portion 22 during use.

Positioning apertures 32 in close proximity to the free end 14 of the receiver tube 12 and frictionally caging the shank portion 22 adjacent such free end 14 has been found advantageous in decreasing the side forces acting on the hitch pin 28 during turns due to increased resisting force moment characterized by increased distance between the hitch pin 28 and the apertures 32 in a longitudinal direction. Then, the hitch pin 28 is essentially restrained from movement while being positioned within the hitch pin apertures 18 and 26 and, more particularly, is restrained from transferring such side forces onto the peripheral edge of each hitch pin apertures 18 and 26. Thus, the present invention at least minimizes wear and deformation of the hitch pin apertures 18 during use which have been known to change their shape from round to oblong slot due to such side force acting onto the hitch pin 28.

Additional advantage of frictionally caging the shank portion 22 adjacent the free end 14 of the receiver tube 12 and further frictionally caging in a horizontal direction is in at least significantly minimizing side-to-side movement of the shank portion 22 in such horizontal direction thus improving the steering control of the towing vehicle.

Now in reference to FIG. 3, therein is illustrated an alternative embodiment of the rattle preventing means that includes a base portion 62 which is secured to an exterior surface of the receiver tube 12, a pin member 64 which is positioned within the through aperture 32 and a toggle arrangement 66 including a handle 68 which is adapted for moving the pin member 64 member between the first position for directly abutting and immobilizing the shank portion 22 and a second portion for releasing the shank portion 22. It would be appreciated that a second device may be attached on the opposed exterior surface of the receiver tube 12.

Although, the present invention has been shown in terms of preventing rattling in the receiver hitch arrangement, Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A method of preventing rattling in a receiver hitch arrangement including a receiver tube, a mount having a shank portion received within said receiver tube and a hitch pin inserted through hitch pin apertures which are formed in both said receiver tube and said shank portion and which are aligned therebetween at assembly to maintain said mount in a position for towing, said rattling being due to movement between said receiver tube and said shank portion, said method comprising the steps of:
   (a) forming a pair of through apertures in each vertical wall of said receiver tube being in said position for towing and in close proximity to a free end thereof;
   (b) threading said pair of through apertures formed in step (a);
   (c) threadeably engaging a threaded shank of a fastener with each of said pair of through apertures formed in step (a) and threaded in step (b);
   (d) positioning exterior surfaces of vertical walls of said shank portion in spaced relationship with respective interior surfaces of vertical walls of said receiver tube;
   (e) operably advancing each fastener for direct contact with said exterior surface portion of said shank portion of said mount inserted into said receiver tube; and
   (f) frictionally caging said shank portion, between free ends of said threaded shanks of said fasteners, relative to said receiver tube.

2. A method of preventing rattling in a receiver hitch arrangement including a receiver tube, a mount having a shank portion received within said receiver tube and a hitch pin inserted through hitch pin apertures which are formed in both said receiver tube and said shank portion and which are aligned therebetween at assembly to maintain said mount in a position for towing, said rattling being due to movement between said receiver tube and said shank portion, said method comprising the steps of:
   (a) forming at least one through aperture in each vertical wall of said receiver tube being in said position for towing and in close proximity to a free end thereof;
   (b) threading said at least one through aperture formed in step (a);
   (c) threadeably engaging a threaded shank of a fastener with said at least one aperture formed in step (a) and threaded in step (b);
   (d) positioning exterior surfaces of vertical walls of said shank portion in spaced relationship with respective interior surfaces of vertical walls of said receiver tube;
   (e) operably advancing each fastener for direct contact with said exterior surface portion of said shank portion of said mount inserted into said receiver tube; and (f); frictionally caging said shank portion, between free ends of said threaded shanks of said fasteners, relative to said receiver tube.

3. The method, according to claim 2, wherein said method includes the step of securing a reinforcing lip onto said free end of said receiver tube prior to forming said at least one through aperture in step (a) and wherein the step (a) further includes the step of forming said at least one through aperture though a wall of said reinforcing lip.

4. A method of preventing wear and shape deformation of hitch pin apertures employed in a receiver hitch arrangement for connecting a receiver tube and a mount having a shank portion received within said receiver tube with a hitch pin inserted through said hitch pin apertures which are formed in both said receiver tube and said shank portion and which are aligned therebetween at assembly to maintain said mount in a position for towing, said method comprising the steps of:

(a) forming at least one through aperture in each vertical wall of said receiver tube being in said position for towing and in close proximity to a free end thereof;

(b) threading said at least one through aperture formed in step (a);

(c) threadeably engaging a threaded shank of a fastener with said at least one aperture formed in step (a) and threaded in step (b);

(d) operably advancing each fastener for direct contact with an exterior surface portion of said shank portion of said mount inserted into said receiver tube;

(e) frictionally caging said shank portion, between free ends of said threaded shanks of said fasteners, relative to said receiver tube;

(f) decreasing side forces acting on said hitch pin during operation; and (g) decreasing forces applied by said hitch pin to peripheral edges of said hitch pin apertures during operation.

5. A method of improving steering control of a towing vehicle connected by way of a receiver hitch arrangement including a receiver tube, a mount having a shank portion received within said receiver tube and a hitch pin inserted through hitch pin apertures which are formed in both said receiver tube and said shank portion and which are aligned therebetween at assembly to maintain said mount in a position for towing, said method comprising the steps of:

(a) forming at least one through aperture in each vertical wall of said receiver tube being in said position for towing and in close proximity to a free end thereof;

(b) threading said at least one through aperture formed in step (a);

(c) threadeably engaging a threaded shank of a fastener with said at least one aperture formed in step (a) and threaded in step (b);

(d) operably advancing each fastener for direct contact with an exterior surface portion of said shank portion of said mount inserted into said receiver tube;

(e) frictionally caging said shank portion, between free ends of said threaded shanks of said fasteners, relative to said receiver tube; and (f) at least minimizing side-to-side movement of said shank portion and said mount.

* * * * *